Jan. 15, 1929.

F. G. KEYES 1,698,847

METHOD OF AND APPARATUS FOR PRODUCING REFRIGERATION
AND CHEMICAL COMPOUNDS USEFUL THEREIN

Filed July 24, 1925     2 Sheets-Sheet 1

Fig.1

INVENTOR
Frederick G. Keyes
BY
Cooper Kerr & Dunham
HIS ATTORNEYS

Jan. 15, 1929.  1,698,847
F. G. KEYES
METHOD OF AND APPARATUS FOR PRODUCING REFRIGERATION
AND CHEMICAL COMPOUNDS USEFUL THEREIN
Filed July 24, 1925  2 Sheets-Sheet 2
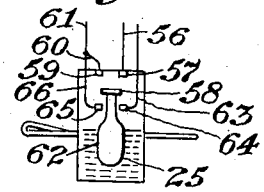
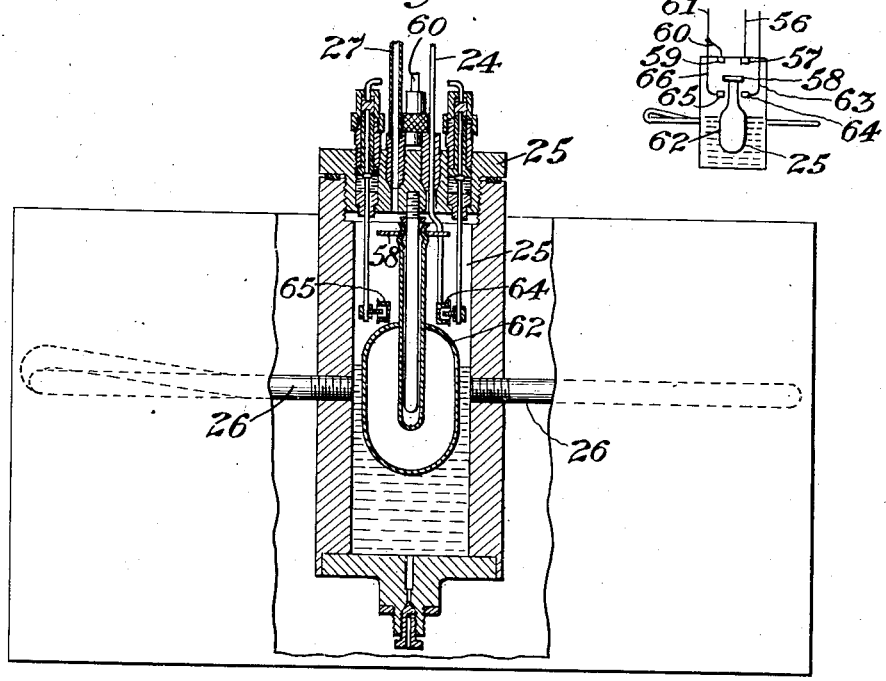
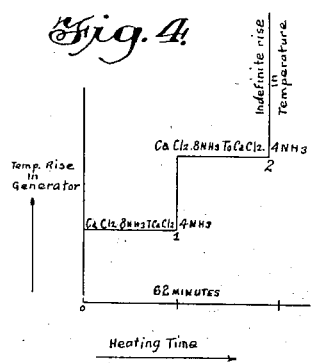
INVENTOR
Frederick G. Keyes
BY
Cooper Kerr + Dunham
HIS ATTORNEYS Patented Jan. 15, 1929.

1,698,847

UNITED STATES PATENT OFFICE.

FREDERICK G. KEYES, OF CAMBRIDGE, MASSACHUSETTS, ASSIGNOR, BY MESNE ASSIGNMENTS, TO NATIONAL REFRIGERATING COMPANY, A CORPORATION OF MASSACHUSETTS.

METHOD OF AND APPARATUS FOR PRODUCING REFRIGERATION AND CHEMICAL COMPOUNDS USEFUL THEREIN.

Application filed July 24, 1925. Serial No. 45,947.

The present invention relates to a new method and apparatus for refrigeration.

Heretofore, in the use of storing materials in refrigerating machines I have found a variety of substances useful as absorbing and as storing materials such as the halides of the metals of the second group of the Mendelejeff periodic system, i. e., beryllium, magnesium, calcium, strontium, barium, radium, with the subgroup comprising zinc, cadmium, and mercury, the chlorides of this group and particularly the highly deliquescent ones being active and readily available for the purpose of absorbing and storing fluids and gases. Of these substances, calcium chloride, because of its cheapness and availability in the market has been selected for the purposes of illustrating my invention, as hereinafter set forth. Each gram of the last named substance takes up as a maximum approximately 1.22 grams of ammonia, the ammonia entering into chemical addition combination as stated in the formula $CaCl_2.8NH_3$.

Fig. 1 is a diagrammatic representation of the apparatus of my application Serial Number 673,105, filed November 6, 1923, and patented March 29, 1927, No. 1,622,522;

Fig. 2 is an elevation view in part section of the refrigerating chamber of said apparatus showing expansion coils and a float controlled contactor for making electrical connections through various parts of electrical control apparatus of the system in accordance with refrigerant levels in the refrigerating chamber;

Fig. 3 is a diagram of said contactor and its immediate connections; and,

Fig. 4 is a curve showing the time-temperature behavior of a generator, such as 13 of Fig. 1, when loaded with a two-stage ammoniated compound such as $CaCl_2.8NH_3$.

During the process of charging the calcium chloride to the maximum content of ammonia represented by the formula $CaCl_2.8NH_3$, the formation of addition compound proceeds through a definite lower order of addition compound, namely: that represented by the formula $CaCl_2.4NH_3$; after this addition compound of lower order (i. e. lower proportionate content of ammonia) has been completely established throughout the mass of material affected, further absorption of ammonia proceeds, forming the addition compound of higher order, represented by $CaCl_2.8NH_3$. Likewise, when the addition composed of higher order is subjected to conditions of generation or emission of absorbed ammonia, the addition compound of higher order emits ammonia until the mass of material affected reaches the condition of lower addition compound order. When this lower order condition supervenes throughout the material, further emission of ammonia is deferred, just as, during the progress of absorption, addition of ammonia to form the higher order compound $CaCl_2.8NH_3$ is deferred until the condition represented by $CaCl_2.4NH_3$ is fully established. Assuming that a generator, such as 13, Fig. 1, shown in my patent application Serial No. 673,105 is initially charged with its proper content of higher-order calcium chloride compound, $CaCl_2.8NH_3$ and the apparatus of which such generator forms a part is put into operation, the first stage will involve heating of the ammonia-saturated material, with concurrent cooling of the condenser coil 21. The heating proceeds until the chemical compound $CaCl_2.8NH_3$ is completely decomposed to the definite compound $CaCl_2.4NH_3$. When the compound $CaCl_2.4NH_3$ is reached, the distillation period according to the method of economical control of the alternating cycles (which characterizes the invention herein described and claimed) is at an end and the liquid level control devices (such as shown in Figs 2 and 3 hereof) of the apparatus operate to shut off the heater coil 15 and turn on the water cooling system to the generator absorber. Care should be exercised to so design the apparatus that sufficient heat is supplied to effect the decomposition of the $CaCl_2.8NH_3$ substantially completely to the compound $CaCl_2.4NH_3$, and to insure that sufficient liquid has been collected in the refrigerating chamber to operate the control devices of the machine to interrupt the heating coil before the temperature in the generator absorber 13 is allowed to reach the point which will decompose the definite compound $CaCl_2.4NH_3$. The decomposition of the latter compound is to be avoided for many reasons; for example, the temperatures at which it is likely to decompose are those at which the ammonia itself will decompose in the presence of metal surfaces, or other catalytic materials which might inadvertently or incidentally be present. It is conceivable that where desired the apparatus in contact with the ammonia at the said higher temperatures may be made of material such as glass, quartz, or of surfaces where catalytic action is a minimum. When the machine reverses and the cooling water is applied to the generator absorber 13, the compound $CaCl_2.4NH_3$ proceeds to change its chemical composition by reverting to the starting compound $CaCl_2.8NH_3$. When the point has been reached where the definite compound $CaCl_2.8NH_3$ is completed, the lowered liquid level in the refrigerating chamber 25—26 permits the float 62 to drop until the contactor 58 strikes contacts 64 and 65 whereby the cooling medium applied to the generator absorber 13 is shut off and the heating coil 15 is turned on and the cycle is repeated.

The relationship between automatic control of the cycle reversals dependent on the alternate accumulation in, and delivery from, the refrigerating chamber of a fixed and predetermined quantity of refrigerant such as ammonia, and the limitation or restraint of the alternating emission and absorption of the said refrigerant material from and by the material stored in the generator between the limits represented by the definite higher order of addition compound (e. g. $CaCl_2.8NH_3$) and the equally definite lower order of addition compound (e. g. $CaCl_2.4NH_3$) produced in the generator material in its entirety, may be illustrated by the following concrete example. Assume that the full charge of material in the generator comprises 2 kilograms of $CaCl_2$ and 2.44 kilograms of ammonia, when the said material in its entirety consists of the definite higher order addition compound $CaCl_2.8NH_3$. If, then the emission stage of the cycle of operation, according to this invention, is to be checked when the generator material has in its entirety assumed the condition represented by the lower-order addition compound $CaCl_2.4NH_3$, the theoretical maximum quantity of ammonia emitted during the emission stage will be one-half of the total combined ammonia, that is say 1.22 kilograms. For practical reasons, it will be preferable to adopt one kilogram of ammonia as the quantity to be delivered to the condenser and from the latter to the refrigerating chamber. Therefore, the cycle stage control contacts 57, 59 and 64, 65 (Fig. 7 of my said application) will be so adjusted that the accumulation of one kilogram of said ammonia in the refrigerating chamber 25 will suffice to raise the float-carried contact member 58 from the contacts 64, 65 to the contacts 57, 59. In this manner, the alternating accumulation in and exhaustion from, the refrigerating chamber, of a weight of refrigerant corresponding to the difference between the weight of refrigerant in combination with a given quantity of absorbent (e. g. $CaCl_2$) in the higher order of addition compound and that in combination in the lower order of addition compound, is made to control and confine the absorption and emission stages of the cycle, in the generator, between the limits represented by the assumption, by the generator-material as a whole, of the higher order compound condition on the one side and the lower order compound condition, on the other.

It is to be understood that in the foregoing I have described the principle of my new invention, using calcium chloride as an example of a material which lends itself to the practice of my invention, and likewise that the invention is applicable to and can be practiced with other apparatus than that shown and described in my application above referred to (Serial No. 673,105). This invention is applicable to apparatus employing the generator-material described in my applications—Serial Nos. 475,855, 586,550, 590,668 and 673,103—together with any of the particular ammoniated compounds specifically described in said application (Serial No. 673,105) for the purpose of facilitating the breaking up of the calcium chloride ammonia compound to one of a definite lower order and/or facilitating the rapid formation of the ammoniated calcium compound of the higher order.

It may be added furthermore as an illustration of utility of the invention of which the principles are above set forth, that the limitation of heat transferences in both aspects between the condition represented by an ammoniated compound of a higher order and that represented by a compound of a lower order considerable economies in operation of refrigerating apparatus may be effected. For instance, as shown in Fig. 4, in the typical case of ammoniated calcium chloride where the condition of maximum ammoniation is represented by $CaCl_2.8NH_3$ and the definitely lower order by $CaCl_2.4NH_3$, at the start of the cycle, with the application of heat, to the $CaCl_2.8NH_3$, the temperature rises rapidly until the pressure is equal to the condensation pressure at the temperature of the cooling water. The rise in temperature then ceases and the temperature of the generator remains substantially constant, the energy being expended in dissociating the ammonia from its compound $CaCl_2.8NH_3$, i. e., the input of energy being translated into output of ammonia, as is indicated by the temperature time curve flattening substantially parallel to the time axis until all of the original $CaCl_2.8NH_3$ has been decomposed to $CaCl_2.4NH_3$. At this point, or, if desired, just before it is reached, the heating operation is interrupted and the reverse cycle initiated in the interests of economy. This procedure results in a maximum of refrigerating effect with a minimum expenditure of energy, as I have discovered that if the decomposition of the remaining lower order chemical compound should take place, the input of energy causes a marked rise in temperature of the $CaCl_2.4NH_3$ analogous to that at the start of the cycle before a new source of ammonia is secured. This latter higher temperature is not only inimical to economy but involves the danger of the decomposition of ammonia itself at the temperature of the disengagement of $NH_3$ from $CaCl_2.4NH_3$. Such decomposition would inevitably defeat the operation of the refrigerating cycle.

It will probably be obvious but may as well be mentioned for the sake of accuracy in description, that, by reason of mechanical and thermal limitations of apparatus, particularly the finite heat conductivity of the materials involved, there will doubtless be limited and substantially insignificant quantities of absorbent in close proximity to the material functioning as the source of heat which, at and near the close of the heating cycle, will be completely divested of ammonia, represented, for instance, by calcium chloride. The presence of such traces of decomposition product derived from the compound of lower order does not in any material degree affect the above described regulated process, nor does it involve attainment of temperatures, even locally, which endanger the ammonia itself, because the persistence of the compound of higher order in the general mass of lower order compound provides a heat absorbent, preventive of dangerously high temperatures at any point.

I claim as my invention:

1. Method of refrigeration, utilizing absorption material capable of forming with a refrigerant fluid definite addition compounds of higher and lower order, characterized by confining the alternating stages of emission and absorption of said refrigerant fluid from and by said material between the limits represented by assumption by said material in its entirety of the condition of higher-order addition compound, on the one hand, and of lower-order addition compound, on the other hand.

2. Method of refrigeration, utilizing absorption material capable of forming with a refrigerant fluid definite addition compounds of higher and lower order, characterized by confining the alternating stages of emission and absorption of said refrigerant fluid from and by said material between the limits represented by assumption by said material in its entirety of the condition of higher-order addition compound, on the one hand, and of lower-order addition compound, on the other hand, and characterized further, by controlling the initiation and cessation of said alternating emission and absorption stages by the accumulation and exhaustion in and from a refrigerating chamber of a quantity of liquefied refrigerant fluid corresponding to the quantity obtainable from the absorption material when functioning between the aforesaid higher and lower limits.

3. Method of refrigeration, utilizing calcium chloride as absorption material and ammonia as refrigerant fluid, characterized by confining the alternating stages of emission and absorption of ammonia from and by the absorption material between the limits represented by assumption by said material in its entirety of the condition represented by the formula $CaCl_2.8NH_3$ on the one hand, and that represented by the formula $CaCl_2.4NH_3$ on the other hand.

4. Method of refrigeration, utilizing calcium chloride as absorption material and ammonia as refrigerant fluid, characterized by confining the alternating stages of emission and absorption of ammonia from and by the absorption material between the limits represented by assumption by said material in its entirety of the condition represented by the formula $CaCl_2.8NH_3$ on the one hand, and that represented by the formula $CaCl_2.4NH_8$ on the other hand, and characterized further, by controlling the initiation and cessation of said alternating emission and absorption stages by the accumulation and exhaustion in and from a refrigerating chamber of a quantity of liquid ammonia corresponding to that obtainable from the absorption material when functioning between the aforesaid higher and lower limits.

5. In refrigerating apparatus of the character indicated, a fixed quantity of absorbent-material capable of forming definite addition-compounds of higher and lower order with a refrigerant fluid, refrigerant fluid in quantity sufficient to form a higher addition compound with the absorbent material, means for alternate reversal between generation and absorption stages of the refrigeration cycle, a refrigerant-condenser, a refrigerating chamber connected to collect liquefied refrigerant and to discharge the same, and means responsive respectively to accumulation in and exhaustion from the refrigerating chamber of a quantity of refrigerant of which the maximum is that producible by transformation of the total quantity of absorbent material from said higher-order addition compound to a lower-order addition compound, to cause reversals from the generation stage to the absorption stage and vice versa, in alternation.

6. In refrigerating apparatus of the character indicated, a fixed quantity of calcium chloride, a quantity of ammonia sufficient to form with said calcium chloride the addition compound represented by the formula $CaCl_2.8NH_3$, means for alternate reversal between ammonia generation and absorption stages of the refrigeration cycle, a condenser, a refrigerating chamber connected to collect liquefied ammonia and to discharge the same, and means responsive respectively to accumulation in and exhaustion from the refrigerating chamber of a quantity of ammonia of which the maximum is that producible by transformation of the total quantity of calcium chloride and ammonia from the compound represented by the formula $CaCl_2.8NH_3$ to that represented by the formula $CaCl_2.4NH_3$ to cause reversals from the generation stage to the absorption stage of the cycle, and vice versa, in alternation.

In testimony whereof I hereto affix my signature.

FREDERICK G. KEYES.